(12) United States Patent
Peterson et al.

(10) Patent No.: US 9,842,686 B2
(45) Date of Patent: Dec. 12, 2017

(54) SPLIT WINDING REPEATER

(71) Applicant: Electrochem Solutions, Inc., Clarence, NY (US)

(72) Inventors: Brian R. Peterson, Cumberland, RI (US); Eric Jankins, Rayham, MA (US)

(73) Assignee: Electrochem Solutions, Inc., Clarence, NY (US)

( * ) Notice: Subject to any disclaimer, the term of this patent is extended or adjusted under 35 U.S.C. 154(b) by 317 days.

(21) Appl. No.: 14/602,828

(22) Filed: Jan. 22, 2015

(65) Prior Publication Data
US 2015/0207337 A1    Jul. 23, 2015

Related U.S. Application Data (60) Provisional application No. 61/930,257, filed on Jan. 22, 2014.

(51) Int. Cl.
*H01F 38/14* (2006.01)
*H01F 27/28* (2006.01)
(Continued)

(52) U.S. Cl.
CPC ............. *H01F 38/14* (2013.01); *H02J 5/005* (2013.01); *H02J 7/025* (2013.01); *H02J 50/12* (2016.02);
(Continued)

(58) Field of Classification Search
CPC ............ H01F 17/0006; H01F 17/0013; H01F 27/2804; H01F 38/14; H01F 2017/0026;
(Continued)

(56) References Cited

U.S. PATENT DOCUMENTS

| 5,341,083 A | 8/1994 | Klontz et al. |
| 5,923,544 A | 7/1999 | Urano |

(Continued)

FOREIGN PATENT DOCUMENTS

| DE | 4031214 | 10/1991 |
| EP | 0558316 | 9/1993 |

(Continued)

OTHER PUBLICATIONS

EP Search, Application No. 15152211.7 dated Oct. 14, 2015.

*Primary Examiner* — Levi Gannon
(74) *Attorney, Agent, or Firm* — Steven W. Winn (57) ABSTRACT

A circuit for transferring wireless electrical energy through a lossy material is described. The circuit comprises a first inductive winding portion connected electrically in series to a second inductive winding portion and at least one capacitor. Interaction of the first or second inductive winding portions with an electromagnetic field emanating from an electrical power source causes electrical energy to be induced within the circuit. The first inductive winding portion is preferably positionable adjacent a first sidewall of a lossy material and the second inductive winding portion is preferably positionable adjacent the second and opposite sidewall of the lossy material. At least one intermediate substrate composed of a ferrite material is preferably positioned between the first and second inductive winding portions as a shield that minimizes electromagnetic field interference.

23 Claims, 7 Drawing Sheets

(51) Int. Cl.
  *H02J 5/00*   (2016.01)
  *H02J 7/02*   (2016.01)
  *H02J 50/12*  (2016.01)

(52) U.S. Cl.
  CPC ............... *H01F 2027/2809* (2013.01); *H01F 2038/146* (2013.01)

(58) Field of Classification Search
  CPC ..... H01F 2017/0066; H01F 2027/2809; H01F 2038/146; H02J 5/005; H02J 7/025; H02J 17/00; H02J 50/12; H04B 5/0037; H04B 5/0075
  USPC .......... 307/104; 320/108; 336/180, 182, 220
  See application file for complete search history.

(56) References Cited

U.S. PATENT DOCUMENTS

| | | | |
|---|---|---|---|
| 6,025,725 | A | 2/2000 | Gershenfeld et al. |
| 6,452,482 | B1 | 9/2002 | Cern |
| 6,809,633 | B2 | 10/2004 | Cern |
| 8,319,925 | B2 * | 11/2012 | Ben-Shalom ......... G02F 1/1333 345/211 |
| 8,461,719 | B2 | 6/2013 | Kesler et al. |
| 8,588,876 | B1 | 11/2013 | Trociewitz et al. |

FOREIGN PATENT DOCUMENTS

| | | |
|---|---|---|
| EP | 1521206 | 4/2005 |
| WO | 2013035986 | 3/2013 |
| WO | 2013142720 | 9/2013 |
| WO | 2013180399 | 12/2013 |

\* cited by examiner

SPLIT WINDING REPEATER

CROSS-REFERENCE TO RELATED APPLICATION

This application claims priority from U.S. Provisional Patent Application Ser. No. 61/930,257 filed Jan. 22, 2014.

FIELD OF THE INVENTION

The present invention relates to a circuit for controlling wireless electrical energy. In particular, the invention relates to a circuit for controlling and modifying wireless electrical energy to operate an electronic device.

PRIOR ART

It is often desirable to be able to power a portable electronic device without the need of a traditional electrical power cable that connects the device to an electrical power outlet. Electrical power cords tether devices and restrict their movement. Therefore, entangled power cords could cause confusion as to what cord is connected to a particular device and further delay usage in untangling the cords. These problems are particularly problematic when powering medical devices, such as electrically powered surgical tools that are used in an operating room environment.

Therefore, it is desirable to power portable electronic devices wirelessly without the need to plug the device into an electrical outlet. One such way of providing electrical power to a portable medical device is by using either primary or secondary electrochemical cells. However, when these cells become depleted through use of the device, the cells need to be replaced or recharged. In either case, use of the device is stopped to exchange or re-charge the cells. Such a delay in use of a medical device is not desirable, particularly when the device is being used to perform a surgical procedure.

In addition, to reduce, if not eliminate, the possibility of patient infection, surgical environments require that a sterile field be sustained continuously throughout a procedure. Generally, a "sterile field" is the space surrounding a surgical site at which a procedure is performed. Further, the sterile field extends to the front of the surgeon and any assisting personnel. This requirement extends not only to medical devices used in the sterile field, but also to power sources used by these medical devices. These medical devices may be used to perform a procedure, to monitor a patient, to monitor the surrounding environment, to provide visual, lighting, audio, recording and other such needs. Power sources are also used in personal protection systems that surgical personnel sometimes wear when performing a procedure. These personal protection systems may include a ventilation unit, a light source, or communication device. These devices generally utilize a rechargeable electrical power source that may be depleted and recharged multiple times.

Many electrical power sources used in the operating room include rechargeable cells. This allows the battery to be repetitively used. A unique set of problems arise when a sterilized surgical device or medical instrument also has a removable battery component that needs to periodically be removed from the device and recharged. Such battery components generally do not stay within the sterile field of a singular operation as they are intended to be used for multiple and different surgical procedures on different patients. As such, to reduce the risk of spreading disease and infection, the battery must either be sterilized before it can be reused in another surgical procedure or, if not sterilized, be transferred into a sterile environment within a sterile container. The former poses performance issues while the latter creates risk for breaching the sterile field. Therefore, there is a need to provide electrical power to recharge electrical power sources or directly power medical devices with minimal physical contact to thus reduce the possibility of contamination thereof.

One such means of providing electrical power to a device or to recharge an electrical power source, such as an electrochemical cell or battery pack, is by using near field resonant inductive coupling to wirelessly transfer electrical energy to the device or the electrical power source. Therefore, since electrical energy is transferred wirelessly, physical contact is reduced and thus the possibility of contaminating the device and/or its electrical power source is minimized.

Figure 1:
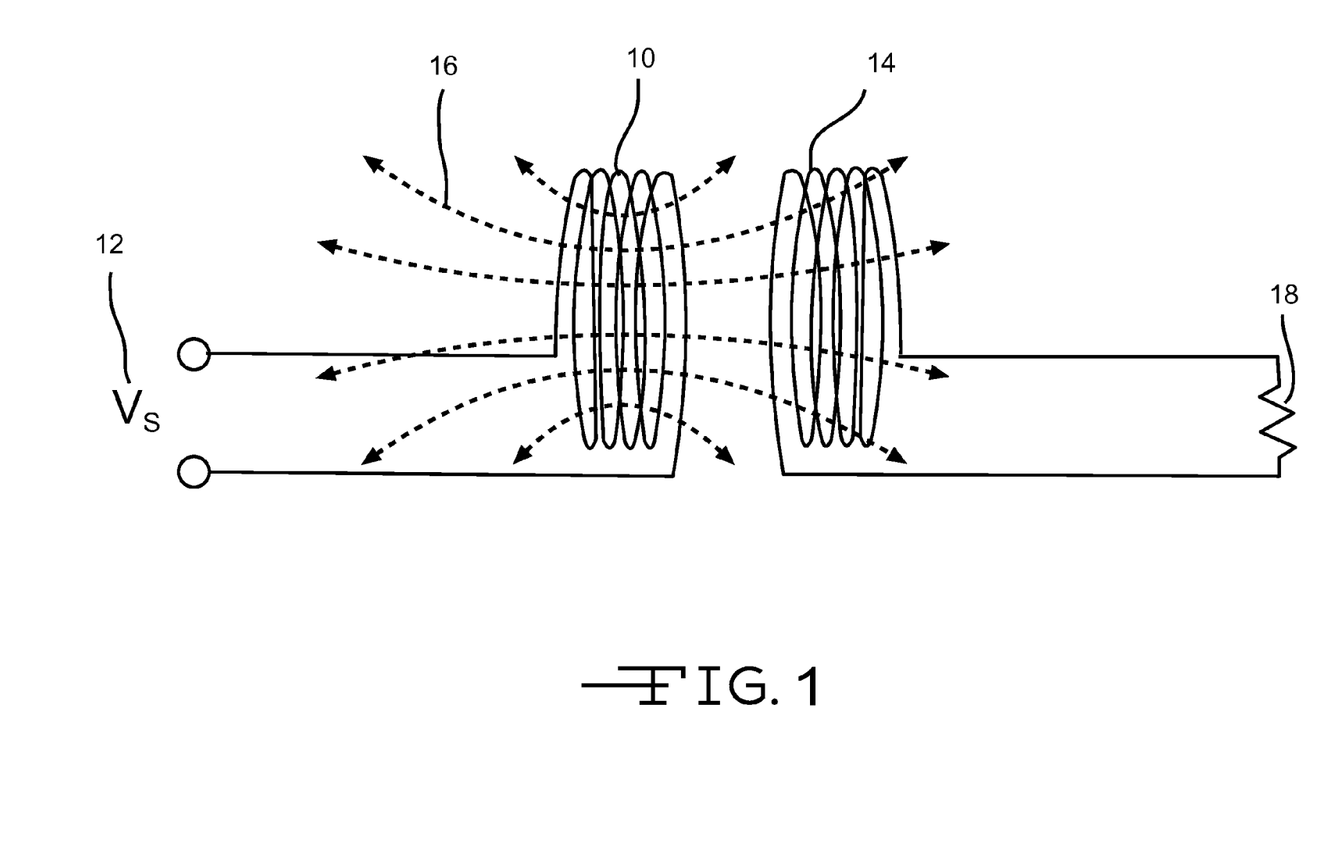
FIG. 1 is a generic block diagram that illustrates an embodiment of near field resonant inductive coupling that is utilized by the wireless electrical energy transfer circuit of the present invention.

In near field resonant inductive coupling, electrical energy is transferred wirelessly between two resonators that are tuned to resonate at about the same frequency. FIG. 1 illustrates a simplistic example of electrical energy wireless transfer using near field resonant inductive coupling. As shown, a first or source resonator 10, is electrically connected to a power supply 12 and a second or receiver resonator 14 is positioned a distance from the source resonator 10. When the two resonators resonate, an oscillating magnetic field 16 between the two is created that enables transfer of electrical energy therebetween. The electrical energy may thus be used to electrically power a load 18, such as a medical device and/or recharge an electrical power source a distance away from the electrical power source. More specifically, near field resonant inductive coupling typically uses coupled electromagnetic resonators with long-lived oscillatory resonant modes to transfer electrical power. Near field resonant inductive coupling is further discussed in U.S. Pat. No. 8,461,719 to Kesler et al.

Nevertheless, wireless transfer of electrical power by near field resonant inductive coupling may be impeded by certain lossy materials as the electromagnetic waves may not be able to penetrate through such materials. Such may be the case when recharging a sterile battery pack. In many cases, battery packs are positioned in metal containers during the sterilization process. It is therefore desirable to leave these battery packs in the metal container to minimize the possibility of contamination. However, the metal of the container typically impedes wireless electrical energy from entering the container to allow the battery packs to be recharged.

Electromagnetic waves transmitted by near field magnetic resonance are capable of penetrating through materials such as various polymeric and ceramic materials. However, penetration of the waves through some metallic materials, such as stainless steel, copper, nickel and aluminum, may be hindered by the skin effect of the metal. Skin effect is the tendency of high-frequency electro-magnetic waves, such as those emitted from an oscillating coil during near field magnetic resonance electrical power transfer, to flow through only an outer layer of a conductive metal. Thus, electromagnetic waves emitted by an oscillating coil may be prevented from penetrating through the thickness of such materials. In such a case, electromagnetic waves generally travel through the skin depth of a conductive metal rather than completely through the thickness of the metal. The skin depth of a conductive metal is the depth beneath the surface of a conductor which carries electrical current or electromagnetic waves at a given frequency. Skin depth is mathematically represented by Equation 1:

$$\text{Skin Depth} = \sqrt{\frac{p}{\pi \times f \times u_0}}$$

where:
  ρ=electrical resistivity of the metal (ohm-meter)
  f=electromagnetic wave frequency (hertz)
  $u_0$=permeability constant ($4\pi \times 10^7$)

Thus, in the case of near field magnetic resonance electrical power transfer, the frequency of the electromagnetic waves that facilitate wireless electrical power transfer are generally of the order of MHz, which generally prohibits penetration through the thickness of a metal. Consequently, for high frequency electromagnetic waves, as is the case for electromagnetic waves emitted by near field magnetic resonance electrical power transfer sources, the span of the skin depth approaches zero and the wave is prohibited from penetrating through the overall thickness of the material. Therefore, there is a need for electrical circuitry that enables the passage of wireless electrical energy through such materials.

The applicants have therefore devised an electrical circuit that enables transfer of wireless electrical energy through such lossy materials as the metals described above, namely, stainless steel, copper, nickel and aluminum. Specifically, the present invention is that of a wireless electrical energy repeater that comprises a first winding inductive portion that is electrically connected in series to a second winding inductive portion and at least one capacitor. When in use, the first winding inductive portion is preferably positioned on a first sidewall of a lossy material and the second winding inductive portion is positioned on an opposite second sidewall of the material. The first and second inductive winding portions are electrically connected in series through an electrically conductive connection that extends through the thickness of the material. Thus, wireless electrical power is enable to pass through the thickness of a material, such as a metal, without loss of strength or quality of the wireless electrical energy.

SUMMARY OF THE INVENTION

Wireless energy transfer using non-radiative techniques may involve the use of magnetic resonator structures as the energy transfer elements. These resonator structures may be adapted to generate an oscillating magnetic field that may be used as the medium of wireless energy transfer. A magnetic resonator structure may comprise one or more inductive elements having an inductance and one or more capacitive elements having a capacitance. The size and shape of the resonator structures may be determined by the amount of power to be transferred and the application for which it is designed. A wireless energy transfer system may require the use of two or more magnetic resonators. Magnetic resonator structures may be referred to as a source and/or device and/or repeater wherein a source resonator or resonators may couple with a device resonator or resonators to generally deliver electrical power to an electrical load.

An object of the present invention is, therefore, to provide an electrical circuit that enables the passage of wirelessly transmitted electrical energy through materials that are generally not penetrable by near field electromagnetic waves. More specifically, the present invention provides an electrical circuit comprising a wireless repeater having a first inductance winding portion located at a first end of the lossy material and that is electrically connected in series with a second inductive winding portion located at a second end thereof that is spaced from the first end. The first and second winding portions located at respective opposite ends of the lossy material are designed to resonate simultaneously at about the same resonant frequency such that when the two winding portions resonate together, the repeater circuit acts as one resonator. Thus, when the first winding portion at the first end of the lossy material is exposed to a near field electromagnetic wave emanating from an electrical source, a first magnetic field is generated about the first winding portion which induces an electrical current to flow through the electrical connection therebetween. The induced electrical energy that is received by the second winding portion causes a second electromagnetic field to be generated about the second inductive winding portion which allows the electrical energy to exit the circuit at the second end to thereby power a load.

The electrical circuit of the present invention operates on the principles of resonant inductive coupling in which electrical energy is wirelessly transmitted between two magnetically coupled coils which resonate at about the same frequency. In regards to the circuit of the present invention, at least one capacitor is electrically connected in series with the first and second inductor windings to enable both the first and second inductor windings of the circuit to resonate at a desired resonant frequency. Thus, the capacitor provides a capacitance that actively adjusts and tunes the resonant frequency of the first and second inductor windings of the circuit to resonate with a source resonator 10 (FIG. 1) and/or a receiver resonator 14 (FIG. 1) at a frequency ranging from about 5 MHz to about 50 MHz, to thereby enable wireless transmission of electrical energy therethrough.

The circuit of the present invention is constructed such that the first inductive winding and second inductive winding portions positioned at respective first and second ends of a lossy material act together as a uniform resonator body that enables transfer of wireless electrical energy through the material.

In a preferred embodiment, the repeater circuit of the present invention comprises at least one intermediate substrate composed of a ferrite material that is positioned between the first and second winding portions. The ferrite material preferably isolates the first and second electromagnetic fields that are generated about the first and second windings positioned at respective opposite ends of the lossy material. Thus, the ferrite material minimizes possible interferences from the adjacent lossy material in addition to minimizing possible interferences from the adjacent electromagnetic fields emanating from opposite ends of the circuit.

These and other objects of the present invention will become increasingly more apparent to those skilled in the art by reference to the following description and to the appended drawings.

DETAILED DESCRIPTION OF THE PREFERRED EMBODIMENTS

Figure 2:
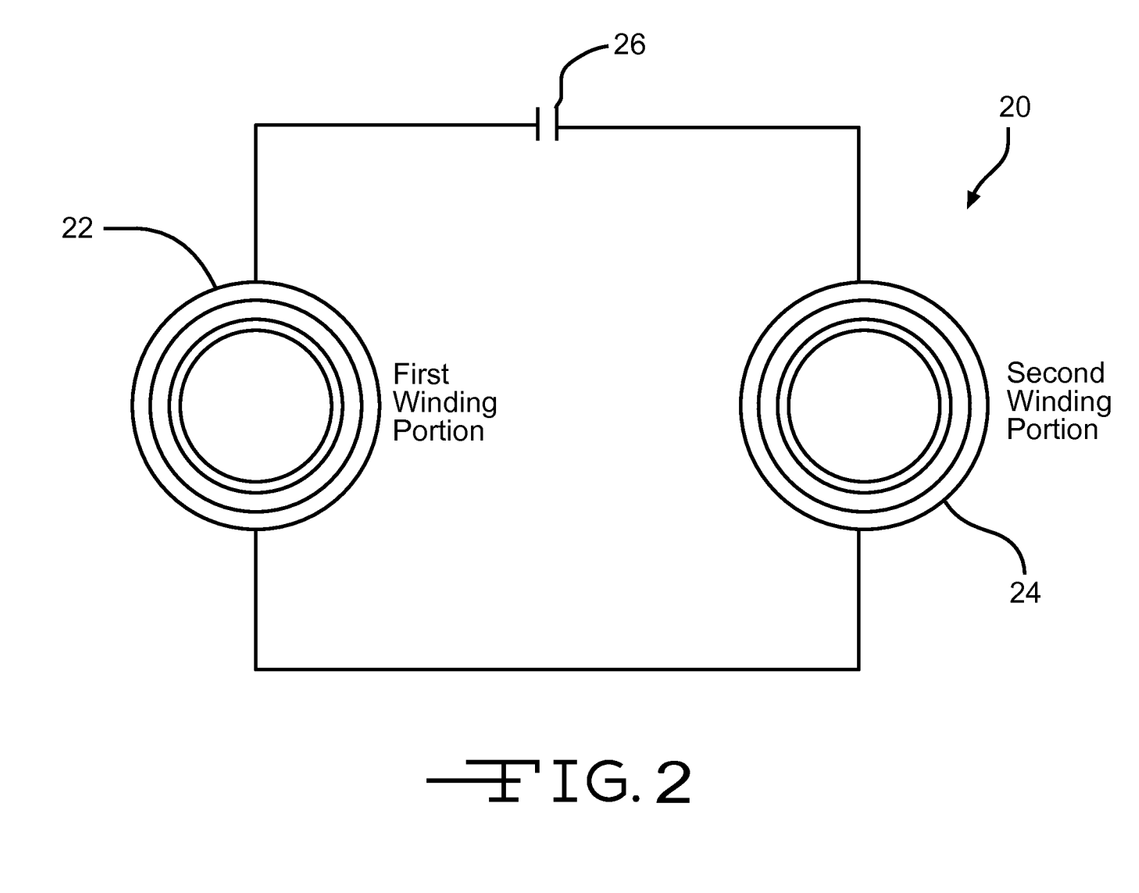
FIG. 2 is an electrical schematic diagram of an embodiment of the wireless electrical energy transfer circuit of the present invention.

Now turning to the figures, FIG. 2 illustrates an electrical schematic diagram of an embodiment of a wireless electrical energy transfer circuit 20 of the present invention. The circuit 20 is designed to facilitate the transfer of wireless electrical energy through lossy materials which may impede transmission therethrough. Specifically, the circuit 20 is designed to facilitate the transfer of wireless near field magnetic resonant electrical energy through lossy materials. As defined herein a "lossy material" is a material that attenuates electromagnetic waves and, thus, prevents penetration therethrough. Examples of such lossy materials include, but are not limited to metals, such as stainless steel, nickel, aluminum, and alloys thereof in which the skin depth is less than the overall thickness of the metal. More specifically, the wireless energy transfer circuit 20 of the present invention is of a wireless repeater designed to both receive and transmit wireless alternating current (AC).

As illustrated, the wireless electrical energy transfer circuit 20 comprises a first inductive winding portion 22 located at a first end of the circuit and that is electrically connected in series to a second inductive winding portion 24 located at a second end thereof, spaced from the first end. In a preferred embodiment, both the first and second winding portions 22, 24 are designed to resonate together at about the same resonating frequency as though the circuit is a single resonator. More specifically, either of the first or second inductive winding portions 22, 24 are designed to receive electrical energy that is transmitted wirelessly via near field resonant inductive coupling from a source resonator 10 (FIG. 1) for use in powering an electronic load 18 (FIG. 1). Examples of electronic loads 18 include, but are not limited to a medical device, a portable electronic device, and a consumer electronic device. In addition, the wirelessly transmitted electrical energy may be used to recharge an electrochemical cell or battery pack.

The wireless electrical energy transfer circuit 20 preferably comprises at least one capacitor 26 (FIG. 2) that is electrically connected in series with the first and second inductive winding portions 22, 24. The at least one capacitor 26 provides a capacitance ranging from about 1 pF to about 1 F, more preferably from about 50 pF to about 100 pF that is designed to adjust and match the electrical impedance of the electrical circuit to a characteristic impedance of the power generator 12 or the load at a driving frequency of the source resonator 10 (FIG. 1). The energy transfer circuit 20 is designed to serve as a wireless power repeater that relays the received wireless power through a material or to an alternate position.

Figure 3:
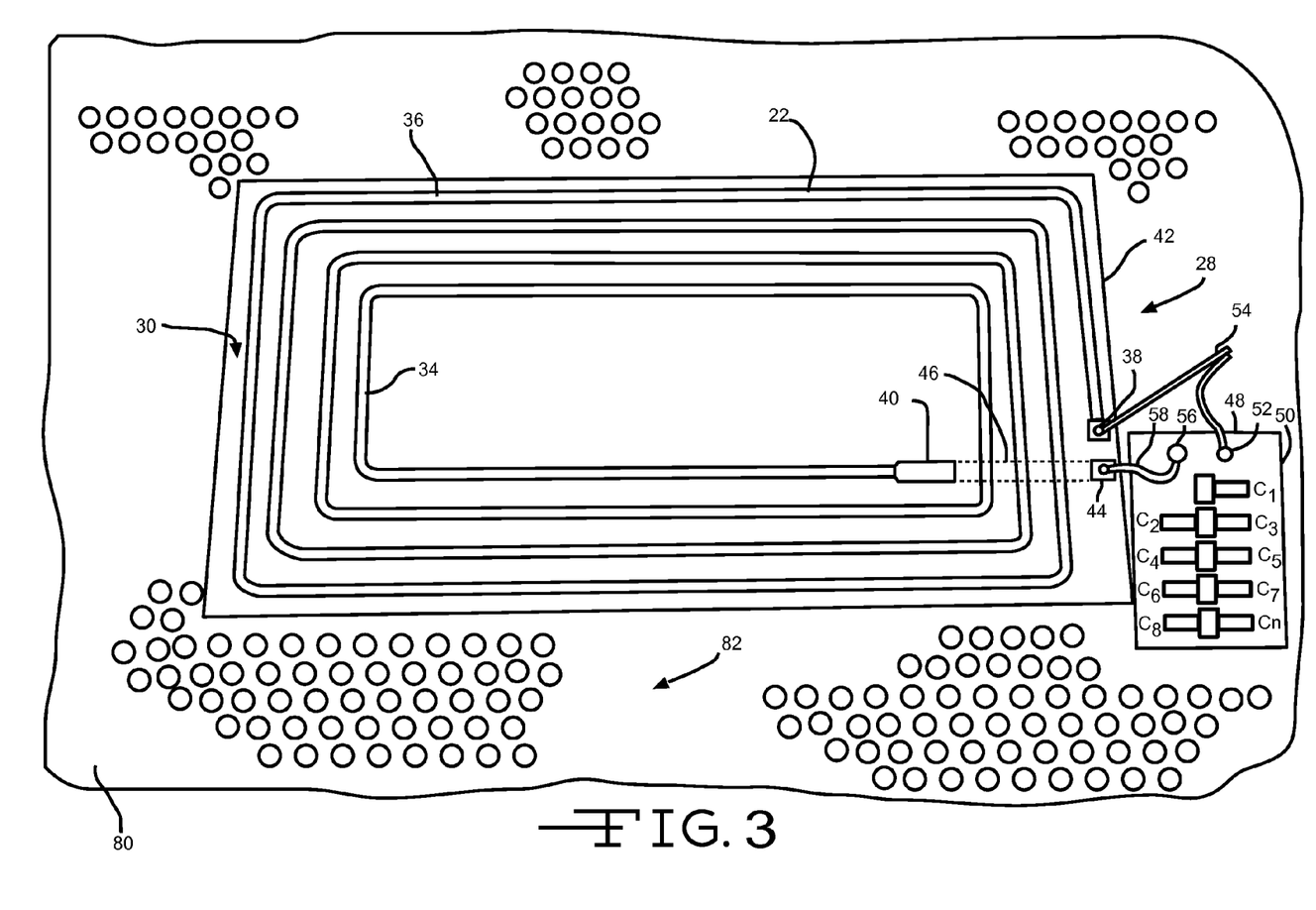
FIG. 3 illustrates a top view of an embodiment of a first insulative substrate comprising a first inductive winding portion of the circuit shown in FIG. 1.
Figure 4:
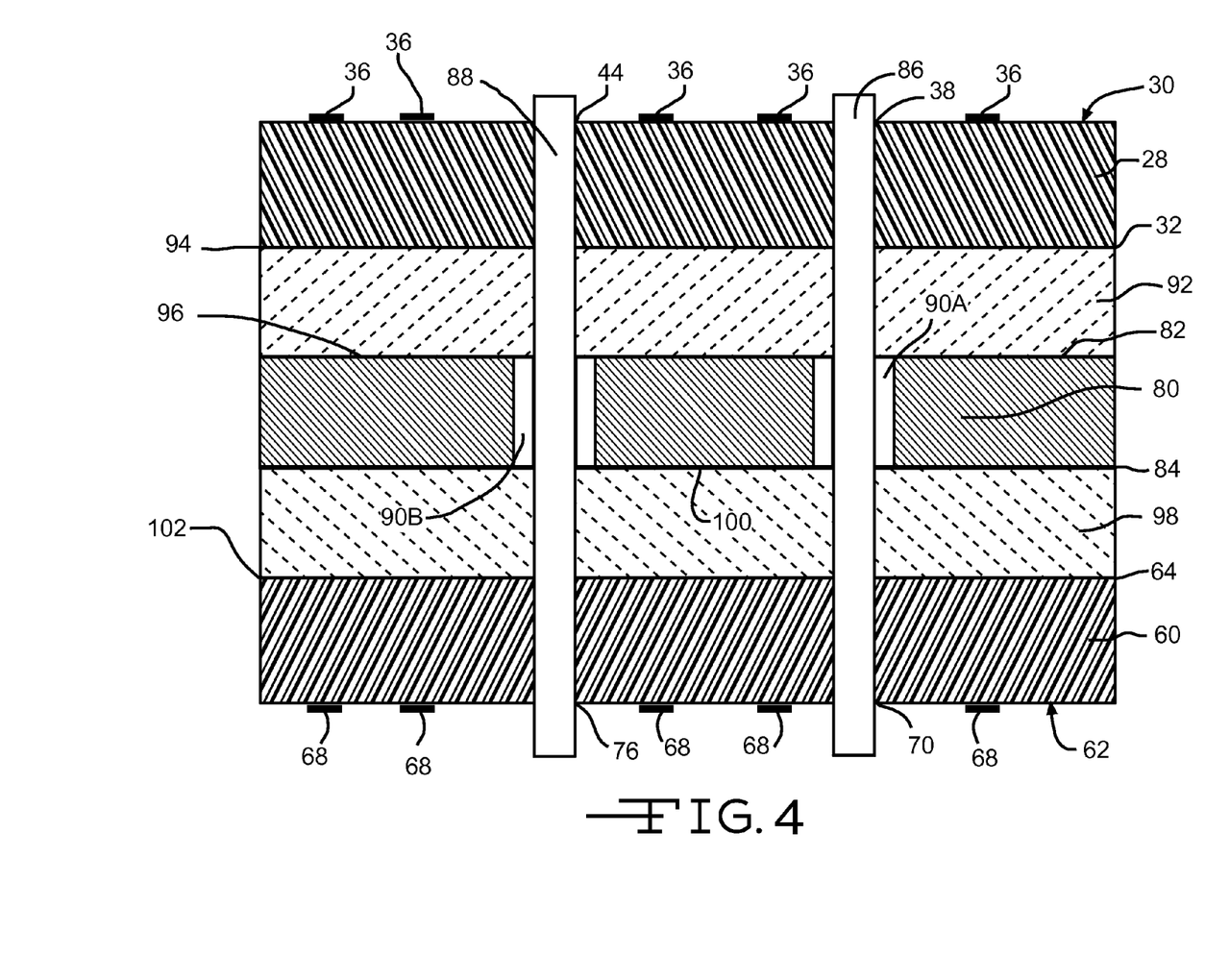
FIG. 4 is a cross-sectional view illustrating an embodiment of the electrical connection between the first and second insulative substrates positioned about the first substrate and in relation to the first and second intermediate substrates.

FIG. 3 illustrates a preferred embodiment of a first insulative substrate 28 having opposed top and bottom surfaces 30, 32 (FIG. 4). In a preferred embodiment, the first winding portion 22 comprises a first inductive coil 34 that is supported on the top surface 30 of the first insulative substrate 28. Alternatively, the first inductive coil 34 may reside on the first insulative substrate bottom surface 32. The first coil 34 comprises a first conductive trace 36 that is preferably oriented in a serpentine manner about the top surface 30 of the first insulative substrate 28. The first conductive trace 36 is preferably positioned about the top surface 30 of the first insulative substrate 28 such that an adequate inductance to facilitate wireless power transfer is formed between adjacent portions of the coiled trace 36. An example inductance for the first coil 34 may range from between about 3 µH to about 20 µH. The path of the conductive trace 36 is preferably spaced so that it does not electrically contact itself.

In a preferred embodiment, the first conductive trace 36 forms a continuous electrically conductive path that meanders about the top surface 30 of the first insulative substrate 28 starting from a first terminal end 38 and ending at a second terminal end 40. In a preferred embodiment, the first conductive trace 36 may be constructed having a trace width ranging from about 1 mm to about 4 mm. In addition, the first coil 34 may be constructed having a gap between adjacent portions of coil turn portions of between about 2 mm to about 5 mm.

As illustrated in FIG. 3, the first terminal end 38, which serves as either a positive or negative terminal for the circuit 20, is positioned about an outer perimeter 42 of the first insulative substrate 28. The second terminal end 40 is preferably positioned within an interior portion of the first insulative substrate top surface 30. In a preferred embodiment, shown in FIG. 3, the second terminal end 40 is electrically connected to a third terminal 44 that is positioned adjacent the first terminal end 38. A first via connection 46 positioned internal of the insulative substrate 28 electrically connects the second and third terminal ends 40, 44. The third terminal 44 preferably serves as the other of the negative or positive terminal of the circuit 20 of the present invention.

As shown in the embodiment illustrated in FIG. 3, a bank 48 of capacitors $C_1$-$C_n$ may be in an electrical series connection with the first conductor trace 36 of the first coil 34 of the first winding portion 22. The capacitor bank 48 enables adjustment and tuning of the resonant frequency. While multiple capacitors $C_1$-$C_n$ are illustrated in the example shown in FIG. 3, the circuit 20 may comprise at least one capacitor 26 (FIG. 2) sufficient to provide enough capacitance to actively adjust and tune the resonant frequency of the circuit 20.

As shown, the bank of capacitors $C_1$-$C_n$ are positioned on a separate capacitor substrate 50. A capacitor bank first terminal 52 is shown electrically connected to the first terminal 38 of the first conductive trace 36 via a first capacitor connector 54. A capacitor bank second terminal 56 is shown electrically connected to the third terminal 44 of the first conductive trace 36 via a second capacitor connector 58. Each of the first and second capacitor connectors 54, 58 preferably comprises a conductive wire. Alternatively, the at least one capacitor 26 (FIG. 2) may be positioned on an external surface of either the first or second insulative substrates 28, 60 via a printed circuit board or deposition process technique.

Figure 3A:
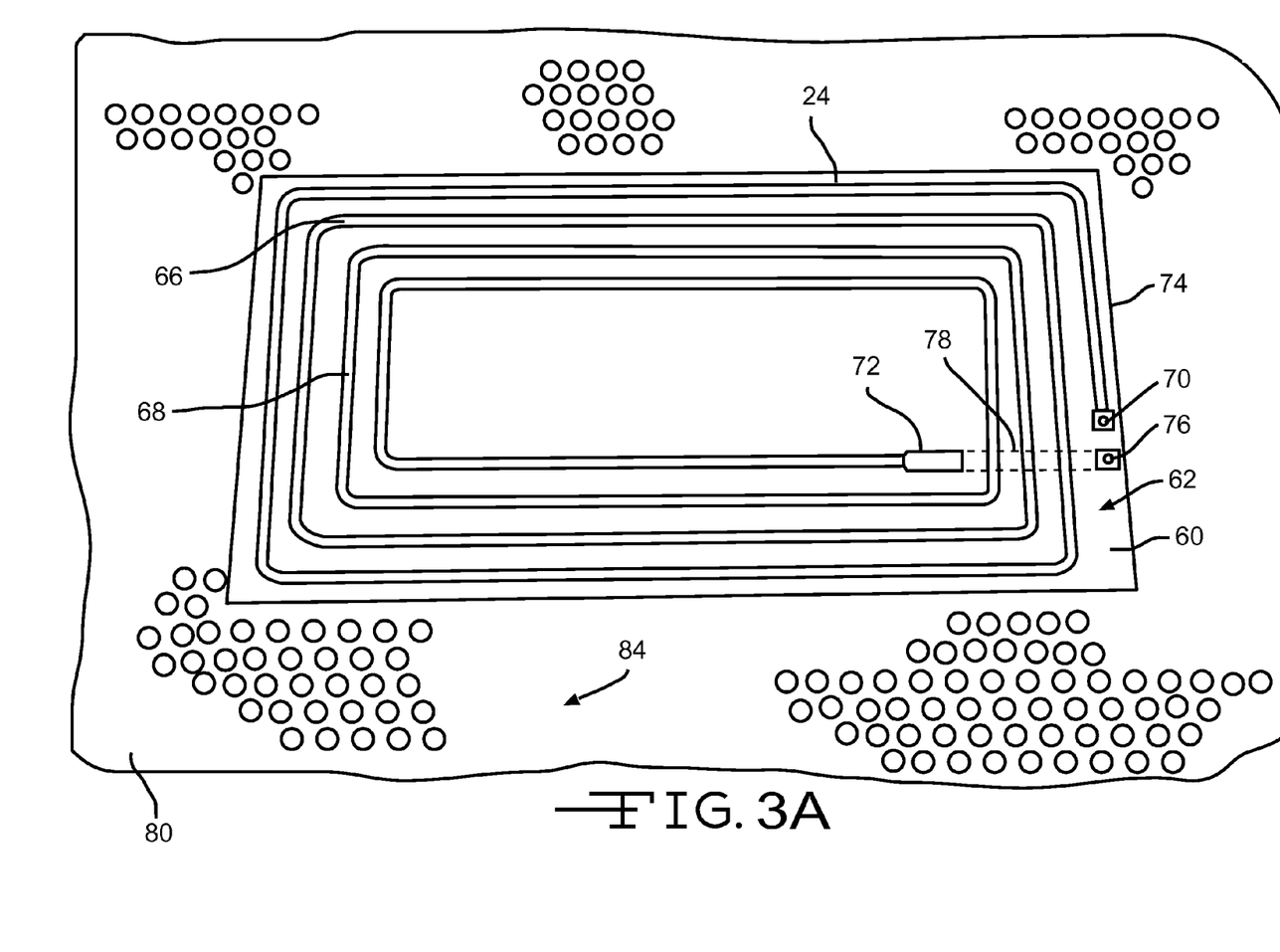
FIG. 3A illustrates a top view of an embodiment of a second insulative substrate comprising a second inductive winding portion of the circuit shown in FIG. 1

FIG. 3A illustrates an embodiment of a second insulative substrate 60 having opposed top and bottom second insulative substrate surfaces 62, 64 (FIG. 4). In a preferred embodiment, the second inductive winding portion 24 supports a second inductive coil 66 on either the top surface 62 or bottom surface 64 of the second insulative substrate 60. As illustrated in the embodiment shown in FIG. 3A, the second inductive coil 66 is supported on the second insulative substrate top surface 62. The second inductive coil 66 comprises a second conductive trace 68 that is preferably oriented in a serpentine manner about the top surface 62 of the second insulative substrate 60. In a preferred embodiment, similar to the first conductive trace 36, the second conductive trace 68 forms a continuous electrically conductive path that meanders about the top surface 62 of the second insulative substrate 60 starting from a second insulative substrate first terminal 70 and ending at a second insulative substrate second terminal 72. The second conductive trace 68, like the first conductive trace 36, is preferably positioned about the top surface 62 of the second insulative substrate 60 such that the path of the second conductive trace 68 is spaced such that an adequate inductance to achieve a desired resonant circuit frequency is formed between adjacent portions of the second coiled trace 68. In a preferred embodiment, the second conductive trace 68 may be constructed having a trace width ranging from about 1 mm to about 4 mm. In addition, the second coil 66 may be constructed having a gap between adjacent portions of coil turn portions of between about 2 mm to about 5 mm. An example inductance for the second inductive coil 66 may range from between about 3 µH to about 20 µH. The second conductive trace 68, like the first conductive trace 36, is preferably oriented about the top surface 62 of the second insulative substrate 60 such that its path does not electrically contact itself. In a preferred embodiment, either of the first or second insulative substrates 28, 60 may comprise a composite material composed of fiberglass and epoxy resin.

In a preferred embodiment shown in FIG. 3A, the second insulative substrate first terminal 70, which serves as either the positive or negative terminal for the circuit 20, is positioned about an outer perimeter 74 of the second insulative substrate 60. The second insulative substrate second terminal 72 is preferably positioned within an interior portion of the second insulative substrate top surface 62. In a preferred embodiment, shown in FIG. 3A, the second insulative substrate second terminal 72 is electrically connected to a second insulative substrate third terminal 76 positioned adjacent the second insulative substrate first terminal 70. A second via connection 78 positioned internal of the second insulative substrate 60 electrically connects between terminals 72, 76. The second insulative substrate first terminal 70 preferably serves as either the positive or negative terminal and the second insulative substrate third terminal 76 preferably serves as the other of the positive or negative terminal of the circuit 20 of the present invention.

Figure 3B:
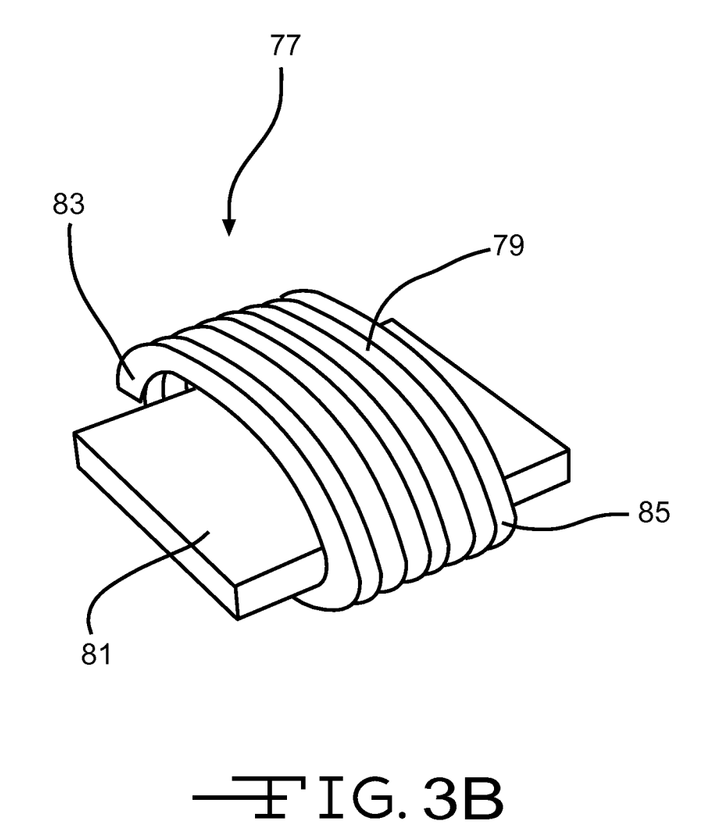
FIG. 3B shows an embodiment of an inductor structure that may be utilized with the wireless electrical energy transfer circuit of the present invention.

Alternatively, either or both of the first and second inductor winding portions 22, 24 may comprise an inductor structure 77 having an inductor wire 79 wrapped circumferentially around an inductor body 81 as illustrated in FIG. 3B. In addition, the at least one capacitor 26 is preferably electrically connected in electrical series to the inductor structure 77 to form a resonator. In this embodiment, one or more inductor structures 77 and capacitors 26 may be used in lieu of either or both the first and second insulative substrates 28, 60. The inductor structure 77 preferably provides an inductance and the at least one capacitor 26 provides a capacitance to the circuit 20.

As illustrated in (FIG. 3B), the inductor wire 79, having a first wire end 83 that extends to a second wire end 85, is circumferentially wrapped around an exterior surface 87 of the inductor body 81. The inductor wire first end 83 is electrically connected to one of the positive or negative terminal of the circuit 20. The inductor wire second end 85 is electrically connected to the other of the positive or negative terminal of the circuit 20. Thus, in a preferred embodiment, the first and second inductor wire ends 83, 85 may be electrically connected in series with the at least one capacitor 26. Alternatively, the inductor structure 77 may be electrically connected in series with the at least one capacitor 26 and either of the first or second insulative substrates 28, 60.

In a preferred embodiment, the inductor body 81 is composed of a magnetic material such as iron oxide. The inductor wire 79 may be composed of an electrically conductive material such as copper. In a preferred embodiment, litz wire or a solid core wire may be used as the inductor wire 79. As defined herein, "litz wire" is defined as an electrically conductive wire that comprises a plurality of wire strands that are individually insulated and twisted or woven together.

FIG. 4 illustrates a cross-sectional view of an example of the wireless electrical energy transfer circuit 20 of the present invention positioned adjacent a lossy material 80. Specifically, FIG. 4 illustrates a cross-sectional view of an embodiment of the first and second insulative substrates 28, 60 positioned adjacent the first substrate 80. As shown, the first insulative substrate 28 and the second insulative substrate 60 are positioned adjacent opposing first and second sidewalls 82, 84 of the lossy material 80. The first insulative substrate 28 is positioned such that its top surface 30 comprising the first conductive trace 36 of the first inductive coil 34 faces away from the first sidewall 82 of the lossy material 80. The second insulative substrate 60 is positioned such that its top surface 62 comprising the second conductive trace 68 of the second inductive coil 66 faces away from the second sidewall 84 of the lossy material 80.

In a preferred embodiment, a first insulative substrate connector 86 electrically connects the first insulative substrate first terminal 38 to the second insulative substrate first terminal 70. A second insulative substrate connector 88 electrically connects the first insulative substrate third terminal 44 to the second insulative substrate third terminal 76. Thus, the first and second insulative substrate connectors 86, 88 electrically connect the first inductive winding portion 22 supported on the first insulative substrate 28 in series with the second inductive winding portion 24 supported on the second insulative substrate 60. In a preferred embodiment, each of the first and second insulative substrate connectors 86, 88 is electrically conductive and may comprise an insulated wire, an electrically conductive trace, flex cable, or via. Furthermore, the first and second insulative substrate connectors 86, 88 may reside in either of a first throughbore 90A or second throughbore 90B that extends through a thickness of the lossy material 80.

As illustrated, the wireless energy transfer circuit 20 of the present invention comprises a continuous circuit loop between the first coil 34 of the first winding portion 22, the second coil 66 of the second winding portion 24, and the at least one capacitor 26. It is important that the polarity between the first and second insulative substrates 28, 60 is consistent. For example, if the first insulative substrate first terminal 38 is an electrically positive terminal, the corresponding second insulative substrate first terminal 70 connected thereto, should also be a positive terminal. Likewise, the first insulative substrate third terminal 44 and the second insulative substrate third terminal 76 connected thereto, would thus be electrically negative terminals.

As previously mentioned, the first inductive coil 34, the second inductive coil 66 and the at least one capacitor 26 are designed to resonate together as a single resonating coil. In a preferred embodiment, both the first and second inductor coils 34, 66 are capable of resonating at about the same resonate frequency, preferably from about 1 kHz to about 100 MHz. This uniform resonance is the result of the electrical series connection between the first and second coils 34, 66 and the capacitor 26 facilitated by the first and second insulative substrate connectors 86, 88.

In addition, capacitance is preferably provided to the circuit 20 by the capacitor bank 48 and inductance is provided by the respective first and second inductive coil structures 34, 66, such as that of the serpentine orientation illustrated in FIGS. 3 and 3A. Alternatively, the inductance may be provided by the inductor structure 77 illustrated in FIG. 3B. This combination of inductance and capacitance in an electrical series connection causes coils 34, 66, and 77, if desired, to resonate at about the same frequency.

In a preferred example, the wireless energy transfer circuit 20 may be constructed having a resonant frequency of between about 5 MHz to about 10 MHz, more preferably about 6.5 MHz to about 7.5 MHz, and most preferably about 6.78 MHz or 13.56 MHz. The exemplar circuit comprises a capacitor having a capacitance of between about 1 pF to about 1 nF. The specific capacitance value of the repeater circuit is dependent upon the resonant frequency and inductance of the circuit thus, the specific capacitance required to achieve a desired resonant frequency can be calculated for a specific circuit design.

In addition, the exemplar repeater circuit 20 is constructed having an inductance ranging from about 5 µH to about 15 µH, more preferably about 10 µH. The preferred example circuit 20 is constructed with the first and second inductive windings 22, 24 having a conductive trace width of about 2.5 mm and a conductive trace gap of about 4 mm, thereby each winding 22, 24 provides an inductance ranging from of about 1 µH to about 5 µH, more preferably about 3 µH.

Furthermore, when the first coil 34 of the first winding portion 22 or the second coil 66 of the second winding portion 24 interacts with a magnetic field emanated from an electrical source 10 (FIG. 1), electrical energy is induced through the first and second insulative substrate connectors 86, 88 between the two coils 34, 66. Thus, once the electrical energy is received at the first or second end of the lossy material, interaction of electrical energy within the resonating circuit 20 causes a magnetic field comprising the electrical energy to leave the repeater circuit 20 through either the first or second winding 22, 24. In a preferred embodiment, the electrical energy leaves the circuit 20 through the opposite winding through which the energy entered the circuit 20, at which point, the wireless electrical energy can thus be received by another receiver resonator.

The resonating frequency of the of the wireless power transfer circuit 20 can be calculated or tuned to a specific desired resonant frequency using the following equation. Furthermore, using the equation below, the required inductance and/or capacitance can also be calculated for a desired resonant frequency. Thus, as provided by Equation 2:

$$\text{Resonant Frequency} = \frac{1}{2\pi\sqrt{L \times C}}$$

where:
L=combined inductance of the first and second coils 34, 66 (Henry)
C=capacitance of the at least one capacitor 26 in series with the circuit (Farads)

In a preferred embodiment, as illustrated in FIG. 4, a first intermediate substrate 92, having opposed top and bottom sidewalls 94, 96 is preferably positioned between the first insulative substrate 28 and the lossy material 80. More specifically, the first intermediate substrate 92 is positioned between the bottom surface 32 of the first insulative substrate 28 and the first sidewall 82 of the lossy material 80. In a preferred embodiment, the first intermediate substrate 92 is composed of a first ferrite material. Alternatively, at least one first intermediate substrate 92 may be positioned between the inductor structure 77 shown in FIG. 3B and the lossy material 80.

In addition, a second intermediate substrate 98, having opposed top and bottom sidewalls 100, 102 may be preferably positioned between the second insulative substrate 60 and the first substrate 80. More specifically, the second intermediate substrate 98 may be positioned between the bottom surface 64 of the second insulative substrate 60 and the second sidewall 84 of the lossy material 80. In a preferred embodiment, the second intermediate substrate 98 is composed of a second ferrite material. The first and second ferrite materials may be of the same or different material composition. As defined herein, a "ferrite material" is a material that is magnetizable and is not electrically conductive. Examples of such ferrite materials that may be used for either or both of the first and second intermediate substrates 92, 98 include, but are not limited to, manganese zinc ferrite, nickel zinc ferrite, strontium ferrite, barium ferrite, and cobalt ferrite. In addition, the first and second intermediate ferrite substrates 92, 98 preferably exhibits a complex permeability of at least 25 ($H \cdot m^{-1}$) measured at the resonant frequency of the circuit 20.

As shown in FIG. 4, the bottom sidewall 96 of the first intermediate substrate 92 is positioned in contact with the bottom sidewall 82 of the lossy material 80. The top sidewall 94 of the first intermediate substrate 92 is positioned in contact with the bottom surface 32 of the first insulative substrate 28. The top surface 30 of the first insulative substrate 28 is facing away from the first intermediate substrate 92 and lossy material 80. The top sidewall 100 of the second intermediate substrate 98 is positioned in contact with the second sidewall 84 of the lossy material 80. The second sidewall 102 of the second intermediate substrate 98 is positioned in contact with the bottom surface 64 of the second insulative substrate 60. The top surface 62 of the second insulative substrate 60 is facing away from the second intermediate substrate 98 and lossy material 80.

In a preferred embodiment, the first and second ferrite intermediate substrates 92, 98 shield magnetic waves 104, 106 that respectively emanate from the first and second coils 34, 66 of the first and second inductive winding portions 22, 24. The first and second intermediate ferrite substrates 92, 98 are designed to minimize any possible interference which may degrade the wireless transmission of electrical energy. First, the intermediate ferrite substrates 92, 98 minimize the interference effects caused by the skin effect of the adjacent lossy material 80. As previously mentioned, the skin effect may absorb the magnetic waves 104, 106 (FIG. 5) that emanate from either or both of the first and second coils 34, 66 of the respective first and second insulative substrates 28, 60 thus possibly degrading or preventing interaction between magnetic fields therebetween. Second, the first and second intermediate ferrite substrates 92, 98 preferably isolate the magnetic waves 104, 106 from interfering with themselves and, thus, possibly preventing wireless electrical energy transmission.

Figure 5:
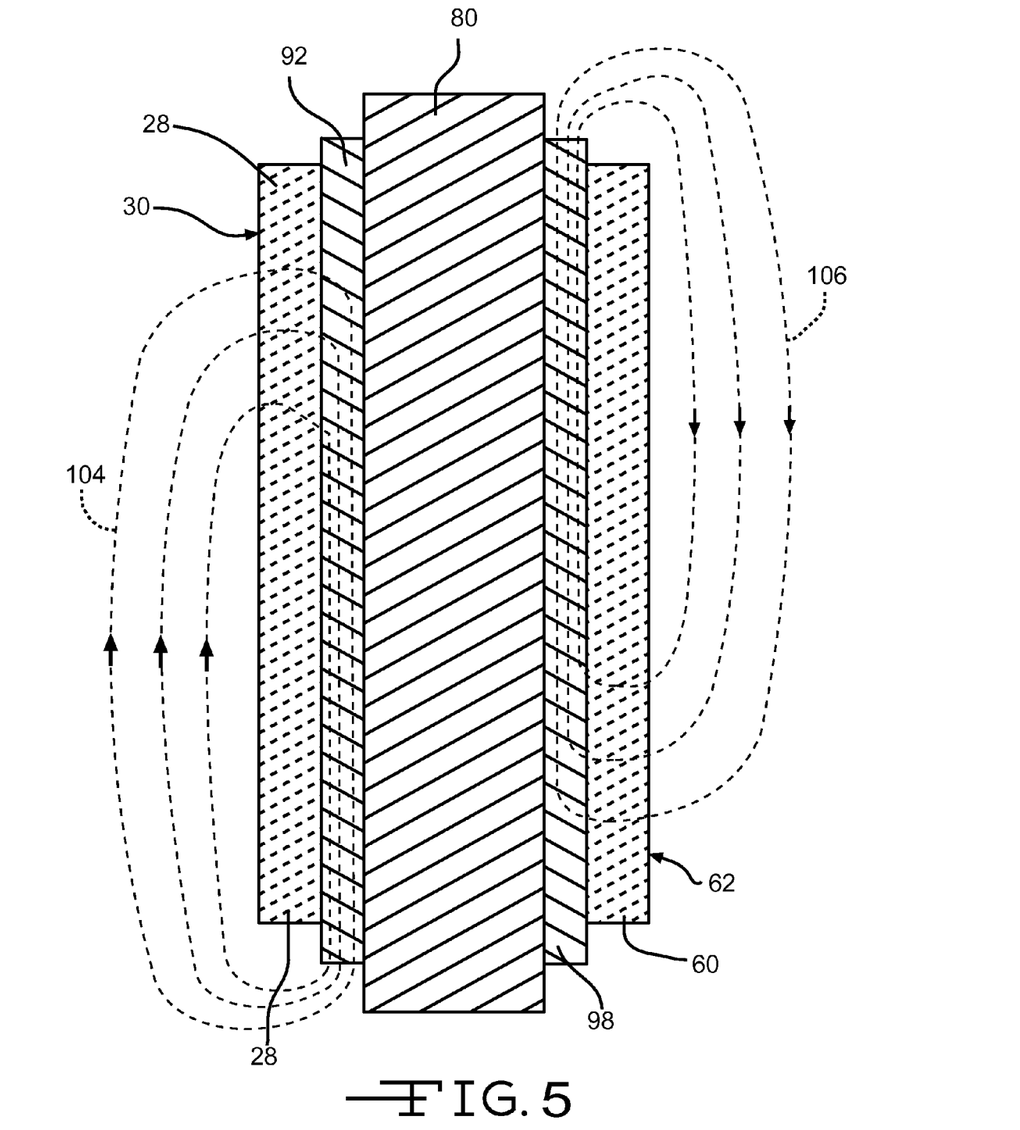
FIG. 5 illustrates a cross-sectional view of an embodiment of the interaction of the electromagnetic waves generated by the first and second inductive winding portions through the intermediate substrates that are shown positioned adjacent a first substrate.

FIG. 5 illustrates a preferred embodiment showing the interaction of magnetic fields 104, 106 with the first and second intermediate substrates 92, 98. For example, when the first winding portion 22 is exposed to a magnetic field emanating from an electrical source, a first magnetic field 104 is induced that emanates from the first winding portion 22. This in turn induces a second magnetic field 106 which emanates from the second winding portion 24. As shown, in FIG. 5, both the first magnetic field 104 and the second magnetic field 106 pass through each of the respective intermediate substrates 92, 98 composed of the ferrite material. Thus, interference with the adjacent lossy material 80 is minimized. As a result of the unimpeded magnetic fields 104, 106, electrical energy is induced through electrical connections 86, 88 to either of the first or second winding portion 22, 24 where the electrical energy exits the circuit 20 of the present invention.

The above detailed description and examples are intended for purposes of illustrating the invention and are not to be construed as limited.

What is claimed is:

1. A wireless electrical energy transfer circuit, comprising:
   a) a first inductive winding portion connected electrically in series to a second inductive winding portion, wherein the first and second inductive winding portions are configured to resonate at a resonant frequency;
   b) at least one capacitor connected electrically in series to the first and second inductive winding portions; and
   c) at least one intermediate substrate composed of a ferrite material positioned between the first and second inductive winding portions;
   d) an electrically conductive connector having a connector proximal end spaced from a connector distal end, wherein the connector extends through the intermediate substrate, and wherein the connector proximal end is electrically connected to the first inductive winding portion, and the connector distal end is electrically connected to the second inductive winding portion; and
   e) wherein interaction of the first or second inductive winding portions with a magnetic field emanating from an electrical source causes electrical energy to be induced between the first and second inductive winding portions through the electrically conductive connector.

2. The wireless electrical energy transfer circuit of claim 1 wherein either of the first or second inductive winding portions comprises an inductor structure having an electrically conductive inductor wire wrapped circumferentially around an inductor body composed of a magnetic material.

3. The wireless electrical energy transfer circuit of claim 1 wherein either of the first or second inductive winding portions comprises a conductive trace that resides on an external insulative substrate surface.

4. The wireless electrical energy transfer circuit of claim 1 wherein the first inductive winding portion comprises a first electrically conductive trace residing on an external surface of a first insulative substrate and the second inductive winding portion comprises a second electrically conductive trace residing on an external surface of a second insulative substrate.

5. The wireless electrical energy transfer circuit of claim 4 wherein the first and second insulative substrates comprise a composite material composed of fiberglass and epoxy resin.

6. The wireless electrical energy transfer circuit of claim 1 wherein the ferrite material is selected from the group consisting of manganese zinc ferrite, nickel zinc ferrite, strontium ferrite, barium ferrite and cobalt ferrite.

7. The wireless electrical energy transfer circuit of claim 1 further comprising a lossy material having opposed proximal and distal surfaces, wherein the first inductive winding portion is positioned adjacent to the lossy material proximal surface and the second inductive winding portion is positioned adjacent to the lossy material distal surface, and wherein the lossy material is a material that attenuates electromagnetic waves.

8. The wireless electrical energy transfer circuit of claim 1 wherein the resonant frequency ranges from about 1 kHz to about 100 MHz.

9. A wireless electrical energy transfer circuit, comprising:
   a) a first inductive coil;
   b) a second inductive coil spaced from the first inductive coil, wherein the first and second inductive coils are electrically connected in series by an electrical connection therebetween, and wherein the first and second inductive coils are configured to resonate at a resonant frequency;
   c) a lossy material having a lossy material proximal surface opposed from a lossy material distal surface, wherein the first inductive coil is positioned adjacent to the lossy material proximal surface and the second inductive coil is positioned adjacent to the opposing lossy material distal surface, and wherein the lossy material is a material that attenuates electromagnetic waves;
   d) at least one capacitor electrically connected in series to the first and second inductive coils;
   e) at least one intermediate substrate composed of a ferrite material, wherein the at least one intermediate substrate is positioned between the first inductive coil and the lossy material proximal surface, between the second inductive coil and the lossy material distal surface or combination thereof; and
   f) wherein interaction of the first or second inductive coils with a first magnetic field emanating from an electrical source causes electrical energy to be induced between the first and second inductive coils through the electrical connection.

10. The wireless electrical energy transfer circuit of claim 9 wherein the induced electrical energy is capable of wirelessly exiting the circuit through a second magnetic field formed about the first or second inductive coil.

11. The wireless electrical energy transfer circuit of claim 9 wherein the first inductive coil comprises a first electrically conductive trace positioned on an external surface of a first insulative substrate and the second inductive coil comprises a second electrically conductive trace positioned on an external surface of a second insulative substrate.

12. The wireless electrical energy transfer circuit of claim 11 wherein the first or second insulative substrate comprises a composite material composed of fiberglass and epoxy resin.

13. The wireless electrical energy transfer circuit of claim 9 wherein the at least one intermediate substrate is composed of a ferrite material selected from the group consisting of manganese zinc ferrite, nickel zinc ferrite, strontium ferrite, barium ferrite and cobalt ferrite.

14. The wireless electrical energy transfer circuit of claim 9 wherein the resonant frequency ranges from about 1 kHz to about 100 MHz.

15. The wireless electrical energy transfer circuit of claim 9 wherein an electrically conductive connector having spaced apart proximal and distal connector ends extends through the lossy material and the at least one intermediate substrate, and wherein the connector proximal end is electrically connected to the first inductive winding portion and the connector proximal end is electrically connected to the second inductive coil.

16. The wireless electrical energy transfer circuit of claim 15 wherein a throughbore extends through the lossy material from the lossy material proximal surface to the lossy material distal surface, wherein the electrically conductive connector resides within the throughbore.

17. A method of transferring wireless electrical power, the method comprising the following steps:
 a) providing a first inductive winding portion and a second inductive winding portion connected electrically in series to the first inductive winding portion;
 b) providing at least one capacitor connected electrically in series between the first inductive winding portion and the second inductive winding portion to enable the first and second inductive winding portions to resonate at a resonant frequency;
 c) providing at least one intermediate substrate composed of a ferrite material and positioning the at least one intermediate substrate between the first and second winding portions;
 d) providing an electrically conductive connector comprising a connector proximal end spaced from a connector distal end and positioning the electrically conductive connector through the at least one intermediate substrate so that the connector proximal end is electrically connected to the first inductive winding portion, and the connector distal end is electrically connected to the second inductive winding portion; and
 e) exposing either the first or second inductive winding portions to a first magnetic field emanating from an electrical energy source so that electrical energy is induced between the first and second inductive winding portions through the connector.

18. The method of claim 17 including providing a lossy material and positioning the lossy material between the first and second inductive winding portions, wherein the lossy material comprises a material that attenuates electromagnetic waves.

19. The method of claim 17 including selecting the resonant frequency of the first or second inductive winding portions at a frequency between about 1 kHz to about 100 MHz.

20. The method of claim 17 including selecting the ferrite material from the group consisting of manganese zinc ferrite, nickel zinc ferrite, strontium ferrite, barium ferrite and cobalt ferrite.

21. The method of claim 17 including providing either of the first or second inductive winding portions as an inductor structure having an electrically conductive inductor wire wrapped circumferentially around an inductor body composed of a magnetic material.

22. The method of claim 17 including providing the first or second inductive winding portions comprised of a conductive trace that resides on an external substrate surface.

23. The method of claim 17 including providing a lossy material having opposing proximal and distal surfaces and positioning the first inductive winding portion adjacent the lossy material proximal surface and positioning the second inductive winding portion adjacent to the lossy material distal surface, and wherein the lossy material is composed of a material that attenuates electromagnetic waves.

* * * * *